US011661514B2

(12) United States Patent
Lee et al.

(10) Patent No.: US 11,661,514 B2
(45) Date of Patent: May 30, 2023

(54) POLYPHENYLENE ETHER COMPOSITION, METHOD FOR THE MANUFACTURE THEREOF, AND ARTICLES COMPRISING THE COMPOSITION

(71) Applicant: SABIC GLOBAL TECHNOLOGIES B.V., Bergen op Zoom (NL)

(72) Inventors: Jung Ah Lee, Selkirk, NY (US); Christopher Ryan Ziegler, Selkirk, NY (US); Christiaan Henricus Johannes Koevoets, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 299 days.

(21) Appl. No.: 16/767,652

(22) PCT Filed: Jan. 3, 2019

(86) PCT No.: PCT/US2019/012149
§ 371 (c)(1),
(2) Date: May 28, 2020

(87) PCT Pub. No.: WO2019/139812
PCT Pub. Date: Jul. 18, 2019

(65) Prior Publication Data
US 2020/0332116 A1 Oct. 22, 2020

(30) Foreign Application Priority Data

Jan. 10, 2018 (EP) .................................. 18150969

(51) Int. Cl.
| | |
|---|---|
| *C08L 71/12* | (2006.01) |
| *C08L 23/06* | (2006.01) |
| *C08L 25/06* | (2006.01) |
| *C08L 53/02* | (2006.01) |
| *C08K 3/04* | (2006.01) |
| *C08K 3/40* | (2006.01) |
| *C08K 7/06* | (2006.01) |
| *C08K 7/14* | (2006.01) |

(52) U.S. Cl.
CPC .............. *C08L 71/123* (2013.01); *C08L 23/06* (2013.01); *C08L 25/06* (2013.01); *C08L 53/02* (2013.01); *C08K 3/04* (2013.01); *C08K 3/40* (2013.01); *C08K 7/06* (2013.01); *C08K 7/14* (2013.01)

(58) Field of Classification Search
CPC .......... C08L 53/02; C08L 23/06; C08L 25/06; C08L 71/123
See application file for complete search history.

(56) References Cited

U.S. PATENT DOCUMENTS

| | | | |
|---|---|---|---|
| 7,902,296 | B2 | 3/2011 | Zijlma et al. |
| 2004/0101748 | A1 | 5/2004 | Puttaiah et al. |
| 2008/0312371 | A1 | 12/2008 | Todt et al. |
| 2009/0306273 | A1 | 12/2009 | Sokolowski |

FOREIGN PATENT DOCUMENTS

| | | |
|---|---|---|
| JP | 2006257256 A | 9/2006 |
| WO | 2009158109 A2 | 12/2009 |
| WO | 2013080129 | 6/2013 |
| WO | 2016142803 A1 | 9/2016 |
| WO | 2017187283 A1 | 11/2017 |

OTHER PUBLICATIONS

International Search Report for the corresponding PCT/US2019/012149; International Filing Date: Jan. 3, 2019; dated Mar. 14, 2019; 5 pages.
Tang, W. et al., "Simultaneous Toughening of PPO/HIPS/Glass Fiber Reinforced Composites with Thermoplastic Rubbers", Journal of Applied Polymer Science, DOI 10.1002; 2014; 8 pages.
Written Opinion for the corresponding PCT/US2019/012149; International Filing Date: Jan. 3, 2019; dated Mar. 14, 2019; 7 pages.

*Primary Examiner* — Arrie L Reuther
(74) *Attorney, Agent, or Firm* — Cantor Colburn LLP

(57) ABSTRACT

A composition useful for the injection molding of fluid engineering parts includes specific amounts of a poly(phenylene ether), a homopolystyrene, a hydrogenated block copolymer of an alkenyl aromatic monomer and a conjugated diene, a linear low density polyethylene, and a reinforcing filler. A method of making the composition and articles prepared from the composition are also described.

8 Claims, No Drawings

POLYPHENYLENE ETHER COMPOSITION, METHOD FOR THE MANUFACTURE THEREOF, AND ARTICLES COMPRISING THE COMPOSITION

CROSS-REFERENCE TO RELATED APPLICATIONS

This application is a National Stage application of PCT/US2019/012149, filed Jan. 3, 2019, which claims benefit of European Application No. 18150969.6 filed on Jan. 10, 2018, both of which are incorporated by reference herein in their entirety.

BACKGROUND

Poly(phenylene ether) resin is a type of plastic known for its excellent water resistance, dimensional stability, and inherent flame retardancy. Properties such as strength, stiffness, chemical resistance, and heat resistance can be tailored by blending it with various other plastics and additives in order to meet the requirements of a wide variety of consumer products, for example, plumbing fixtures, electrical boxes, automotive parts, and coated wire.

In order to eliminate the lead content typically present in the brass used to fabricate fluid engineering articles, poly(phenylene ether) compositions have been used as replacements for brass. See, for example, U.S. Patent Application Publication No. US 2008/0312371 A1 of Todt et al. There is also a desire to eliminate the monomer butadiene from materials that contact food and water. Many of the poly(phenylene ether) compositions utilized for fluid engineering articles contain rubber-modified polystyrene to improve impact strength. Rubber-modified polystyrene contains polybutadiene, and the poly(phenylene ether) compositions containing rubber-modified polystyrene have small but significant concentrations of free butadiene that can be above the limits of some existing and proposed regulations governing materials contacting food and water.

Reinforced plastic articles are also of interest for applications requiring high levels of stiffness, rigidity, and strength. Inclusion of fiber reinforcement in a polymeric matrix generally leads to increased strength in melt-processed parts, provided that the fiber reinforcement is aligned with the direction of an applied stress and has adequate adhesion to the matrix. However, melt-processing of complex parts using a fiber-reinforced plastic composition often results in a part that does not possess the aforementioned fiber orientation or in a part that exhibits so-called "knit-lines" resulting from two impinging melt flow fronts, providing a morphology wherein glass fibers generally do not sufficiently reinforce in the area of the knitline.

Accordingly, there remains a need in the art for improved reinforced poly(phenylene ether) compositions that can overcome the above-described technical limitations, and, in particular, can be useful in the preparation of complex molded parts for water contact applications (e.g., water meter housings, pump casings, and the like). Moreover, it would be desirable to improve dimensional stability, creep, and fatigue resistance in poly(phenylene ether) molded parts that meets global potable water regulations.

BRIEF DESCRIPTION

A poly(phenylene ether) composition comprises 25 to 40 weight percent of a poly(phenylene ether); 20 to 54 weight percent of a homopolystyrene; 1 to 20 weight percent of a hydrogenated block copolymer of an alkenyl aromatic monomer and a conjugated diene; 0.1 to 2 weight percent of a linear low density polyethylene; and 8 to 42 weight percent of a reinforcing filler; wherein weight percent of each component is based on total weight of the composition.

A method for the manufacture of the poly(phenylene ether) composition comprises melt-mixing the components of the composition.

An article comprising the poly(phenylene ether) composition is also described.

The above described and other features are exemplified by the following figures and detailed description.

DETAILED DESCRIPTION

The present inventors have determined that a particular poly(phenylene ether) composition exhibits improved mechanical strength and fatigue resistance. Specifically, the present inventors have determined that a poly(phenylene ether composition) including particular amounts of a poly(phenylene ether), a homopolystyrene, a hydrogenated block copolymer of an alkenyl aromatic monomer and a conjugated diene, a linear low density polyethylene, and a reinforcing filler can be particularly useful in providing molded articles having improved physical properties, in particular with regard to fatigue performance.

Accordingly, an aspect of the present disclosure is a poly(phenylene composition). The composition comprises a poly(phenylene ether). Suitable poly(phenylene ether)s include those comprising repeating structural units having the formula

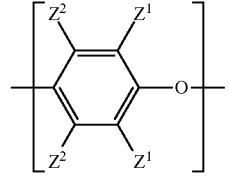

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue.

As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) is essentially free of incorporated diphenoquinone residues. In the context, "essentially free" means that the less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in International Patent Application Publication No. WO2009/104107 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of 0.25 to 1 deciliter per gram, specifically 0.25 to 0.7 deciliter per gram, more specifically 0.35 to 0.55 deciliter per gram, even more specifically 0.35 to 0.50 deciliter per gram, measured at 25° C. in chloroform using an Ubbelohde viscometer.

In some embodiments, the poly(phenylene ether) comprises molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

In some embodiments, the composition comprises the poly(phenylene ether) in an amount of 25 to 40 weight percent, or 27 to 40 weight percent, or 31 to 45 weight percent, or 31 to 43 weight percent, based on the total weight of the composition.

In addition to the poly(phenylene ether), the composition comprises a homopolystyrene. As used herein, the term "homopolystyrene" refers to a polymer consisting of repeating units derived from polymerization of styrene. The styrene homopolymer can be atactic, isotactic, or syndiotactic.

In some embodiments, the homopolystyrene has a number average molecular weight of 10,000 to 200,000 grams per mole, specifically 30,000 to 100,000 grams per mole.

In some embodiments, the homopolystyrene has a melt flow index of 0.5 to 10 grams per 10 minutes, specifically 1 to 5 grams per 10 minutes, measured at 200° C. and 5 kilogram load according to ASTM D1238-10.

In some embodiments, the composition comprises the homopolystyrene in an amount of 20 to 54 weight percent, or 20 to 50 weight percent, or 20 to 36 weight percent, or 20 to 35 weight percent, or 20 to 33 weight percent, or 20 to 31 weight percent, or 20 to 29 weight percent, based on the total weight of the composition.

In addition to the poly(phenylene ether) and the homopolystyrene, the composition comprises a reinforcing filler. Suitable reinforcing fillers can include, for example, glass fibers, carbon fibers, aromatic polymer fibers, mineral fillers, or a combination comprising at least one of the foregoing. In a specific embodiment, the reinforcing filler comprises, or consists of, glass fibers. Suitable glass fibers include those based on E, A, C, ECR, R, S, D, and NE glasses, as well as quartz. In some embodiments, the glass fiber has a diameter of 2 to 30 micrometers, specifically 5 to 25 micrometers, more specifically 10 to 15 micrometers. In some embodiments, the length of the glass fibers before compounding is 2 to 7 millimeters, specifically 3 to 5 millimeters. The glass fiber can, optionally, include a so-called adhesion promoter to improve its compatibility with the poly(phenylene ether) and the polystyrene. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville.

In some embodiments, the composition comprises the reinforcing filler in an amount of 8 to 42 weight percent, specifically 10 to 35 weight percent, more specifically 15 to 35 weight percent, still more specifically 20 to 35 weight percent, yet more specifically 24 to 36 weight percent, based on the total weight of the composition.

In addition to the poly(phenylene ether), the homopolystyrene, and the reinforcing filler, the composition further includes a hydrogenated block copolymer of an alkenyl aromatic monomer and a conjugated diene.

For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly (alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly (alkenyl aromatic) content is 40 to 90 weight percent, or 50 to 80 weight percent, or 60 to 70 weight percent, all based on the weight of the high poly(alkenyl aromatic content) hydrogenated block copolymer.

In some embodiments, the hydrogenated block copolymer has a weight average molecular weight of 40,000 to 400,000 grams per mole. The number average molecular weight and the weight average molecular weight can be determined by gel permeation chromatography and based on comparison to polystyrene standards. In some embodiments, the hydrogenated block copolymer has a weight average molecular weight of 200,000 to 400,000 grams per mole, or 220,000 to 350,000 grams per mole, or 150,000 to 400,000 grams per mole. In other embodiments, the hydrogenated block copolymer has a weight average molecular weight of 40,000 to 200,000 grams per mole, or 40,000 to 180,000 grams per mole, or 40,000 to 150,000 grams per mole.

The alkenyl aromatic monomer used to prepare the hydrogenated block copolymer can have the structure

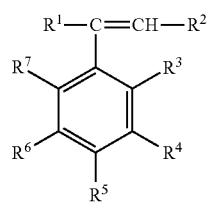

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

The hydrogenated block copolymer can consist of polystyrene-poly(ethylene-butylene)-polystyrene triblock copolymer. In a specific embodiment, the hydrogenated block copolymer is a polystyrene-poly(ethylene-butylene)-polystyrene triblock copolymer having a polystyrene content of 10 to 75 weight percent, or 10 to 40 weight percent, based on the weight of the polystyrene-poly(ethylene-butylene)-polystyrene triblock copolymer, and a weight average molecular weight of 60,000 to 400,000 grams per mole, or 150,000 to 400,000 grams per mole.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene), and from Kuraray as SEPTON™ 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

The composition comprises the hydrogenated block copolymer in an amount of 1 to 20 weight percent, or 1 to 15 weight percent, or 1.5 to 14 weight percent, or 1.5 to 13.5 weight percent, based on the total weight of the composition.

The composition further includes a small amounts of a linear low density polyethylene as a mold release agent. In some embodiments, the polyethylene has a melt flow rate of 15 to 30 grams per centimeter$^3$, specifically 18 to 26 grams per centimeter$^3$, measured according to ISO 1133 at 190° C. and 2.16 kilogram load. As used herein, the term "polyethylene" can include high density polyethylene (HDPE), low density polyethylene (LDPE), medium density polyethylene (MDPE), and linear low density polyethylene (LLDPE). The density of polyethylene (HDPE, LDPE, MDPE, LLDPE) can be 0.90 gram/cm$^3$ to 0.98 gram/cm$^3$. In some embodiments, the polyethylene is a linear low density polyethylene. The polyethylene can be used in an amount of 0.1 to 2 weight percent, or 0.1 to 1.6 weight percent, 0.5 to 2 weight percent, or 0.5 to 1.6 weight percent, or 1 to 2 weight percent, based on the total weight of the composition.

The composition can, optionally, further include one or more additives. Additives include, for example, stabilizers, mold release agents, lubricants, processing aids, drip retardants, nucleating agents, UV blockers, dyes, pigments, antioxidants, anti-static agents, blowing agents, mineral oil, metal deactivators, and antiblocking agents. When additives are present, the total amount of additives is typically less than or equal to 10 weight percent, specifically less than or equal to 6 weight percent, more specifically less than or equal to 4 weight percent, still more specifically less than or equal to 2 weight percent, based on the total weight of the composition. In some embodiments, the total amount of additives can be 0.1 to 5 weight percent.

Advantageously, the composition comprises less than or equal to 1 milligram butadiene per kilogram of composition (i.e., less than or equal to 1 part per million (ppm)). In the context, "butadiene" refers to butadiene monomer; it does not include polymerized butadiene residue. In some embodiments, the composition comprises less than or equal to 0.5 milligram butadiene per kilogram of composition, specifically less than or equal to 0.2 milligram butadiene per kilogram of composition, more specifically less than or equal to 0.1 milligram butadiene per kilogram of composition, even more specifically less than or equal to 0.01 milligram butadiene per kilogram of composition, even more specifically still less than or equal to 0.001 milligram butadiene per kilogram of composition. "Free butadiene" can be detected, for example, as described in the working examples below.

In some embodiments, the composition can exclude various components not specifically mentioned in the present disclosure. For example, the composition can comprise less than or equal to 2 weight percent of any polymer other than the poly(phenylene ether), the homopolystyrene, the hydrogenated block copolymer, and the polyethylene. In some embodiments, the composition can exclude any polymer other than the poly(phenylene ether), the homopolystyrene, the hydrogenated block copolymer, and the polyethylene. In some embodiments, the composition can exclude rubber-modified polystyrene, specifically, non-hydrogenated rubber-modified polystyrene. In some embodiments, the composition can exclude polyamide.

In a very specific embodiment, the composition can comprise 31 to 40 weight percent, or 34 to 40 weight percent of the poly(phenylene ether); 20 to 33 weight percent, or 20 to 31 weight percent of the homopolystyrene; 1 to 15 weight percent of the hydrogenated block copolymer of an alkenyl aromatic monomer and a conjugated diene; 0.1 to 1.6 weight percent of the linear low density polyethylene; and 24 to 36 weight percent of a reinforcing filler; wherein weight percent of each component is based on total weight of the composition. In another specific embodiment, the composition can comprise 31 to 40 weight percent, or 34 to 40 weight percent of the poly(phenylene ether), wherein the poly(phenylene ether) comprises a poly(2,6-dimethyl-1,4-phenylene ether) having an intrinsic viscosity of 0.35 to 0.5 deciliter per gram, determined by Ubbelohde viscometer at 25° C. in chloroform; 20 to 33 weight percent, or 20 to 31 weight percent of the homopolystyrene; 1 to 15 weight percent of the hydrogenated block copolymer of an alkenyl aromatic monomer and a conjugated diene, wherein the hydrogenated block copolymer comprises a polystyrene-poly(ethylene-butylene)-polystyrene triblock copolymer having a polystyrene content of 25 to 35 weight percent, based on the weight of the polystyrene-poly(ethylene-butylene)-polystyrene triblock copolymer; 0.1 to 1.6 weight percent of the linear low density polyethylene; and 24 to 36 weight percent of a reinforcing filler, wherein the reinforcing filler comprises glass fiber; and wherein weight percent of each component is based on total weight of the composition. In some embodiments, the composition consists of the poly(phenylene ether), the homopolystyrene, the hydrogenated block copolymer of an alkenyl aromatic monomer and a conjugated diene, the polyethylene, the reinforcing filler, and, optionally, up to 10 weight percent, specifically up to 6 weight percent, more specifically up to 4 weight percent, even more specifically up to 2 weight percent of additives selected from the group consisting of stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations comprising at least one of the foregoing.

The composition can be prepared by melt blending the components. The melt blending can be performed using common equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of about 240 to about 360° C., specifically about 240 to about 300° C.

The composition is useful for the fabrication of fluid engineering articles. Such articles include, for example, pipes, pipe liners, pipe junctions, hot and cold water device components, boiler components (including flue connectors, hydraulic blocks, and heat exchanger housings), central heating device components, combined hot water and central heating device components, heat exchanger components, heat pump housings, water pump housings (including swimming pool pump housings), filter housings, water meter housings, water valves (including faucet under-body valves, and faucet post valves), impellers, and faucet spouts. The details of thermoplastic fluid engineering articles are known in the art. For example, U.S. Pat. No. 6,129,121 to Kohle describes a pipe junction or "nipple" in which the body can be formed from thermoplastic; U.S. Pat. No. 6,241,840 B1 to Pratt et al. describes a thermoplastic liner pipe for potable water; U.S. Pat. No. 3,906,983 to Parkison et al. describes a thermoplastic bathtub spout; U.S. Pat. No. 7,845,688 B2 to Gallagher et al. describes a piping component with a thermoplastic body; U.S. Pat. No. 7,891,572 to Murray describes a boiler temperature monitoring and low water monitoring system with a thermoplastic insulator; U.S. Pat. No. 7,616,873 B1 to Seitz describes a thermoplastic heat exchanger; U.S. Pat. No. 6,274,375 to McMinn describes a vent hood cleaning system with thermoplastic spray nozzles; U.S. Pat. No. 5,040,950 to Dalquist III et al. describes a power washing apparatus with a thermoplastic bearing housing member; U.S. Patent Application Publication No. US 2009/0304501 A1 of Dickertmann describes a pond pump with a thermoplastic pump housing; U.S. Patent Application Publication No. US 2008/0185323 A1 of Kargenian describes a water treatment system with thermoplastic upper and lower manifolds; U.S. Patent Application Publication No. US 2008/0197077 A1 of Swartley et al. describes a low pressure drinking water purifier with a thermoplastic supply pressure regulator; U.S. Pat. No. 3,811,323 to Swenson describes a liquid meter with a thermoplastic inlet hub assembly; U.S. Patent Application Publication No. US 2008/0029172 A1 of Willems describes an integrated pressure-proof fluid container with various thermoplastic components; U.S. Patent Application No. US 2009/0084453 A1 of Quinn et al. describes a fluid treatment system control valve with a thermoplastic housing; U.S. Pat. No. 5,960,543 to Moon describes a thermoplastic pump impeller. The composition is particularly suited for the fabrication of articles that contact hot water. Fluid engineering articles can be formed by injection molding the composition. Illustrative injection molding conditions are described in the working examples below.

In a specific embodiment, an article comprising the poly(phenylene ether) composition described herein can be a pipe, pipe liner, pipe junction, hot and cold water device component, boiler component, central heating device component, combined hot water and central heating device component, heat exchanger component, heat pump housing, water pump housing, filter housing, water meter housing, water valve, impeller, or faucet spout.

All of the compositional variations described above in the context of the composition apply as well to articles fabricated from the composition.

The compositions, articles, and methods for the manufacture thereof according to the present disclosure are further illustrated by the following examples, which are non-limiting.

EXAMPLES

Materials for the following examples are described in Table 1.

TABLE 1

| Component | Description |
|---|---|
| PPE-1 | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO 646 from SABIC. |
| PPE-2 | Poly(2,6-dimethyl-1,4-phenylene ether), CAS Reg. No. 24938-67-8, having an intrinsic viscosity of about 0.40 deciliter per gram as measured in chloroform at 25° C.; obtained as PPO 640 from SABIC. |
| HIPS | High-impact polystyrene (rubber-modified polystyrene), CAS Reg. No. 9003-55-8, having a volume average particle diameter of 2.4 micrometers, a rubber content of 10 weight percent, a mineral oil content of 1.5 weight percent, and a swell index of 17; obtained as HIPS 3190 from SABIC. |
| PS | Crystal Clear polystyrene, CAS Reg. No. 9003-53-6, having a melt flow of about 2.4 grams per 10 minutes at 200° C. and 5 kilogram load according to ASTM 1238; obtained as 686E from Dow Chemical. |
| SEBS | Polystyrene-poly(ethylene-butylene)-polystyrene triblock copolymer, CAS Reg. No. 66070-58-4, having a polystyrene content of about 30-35 weight percent, a weight average molecular weight of about 240,000 to about 301,000 grams per mole, and a negligible melt flow, measured at 260° C. and 5 kilogram load according to ASTM D1238; obtained as KRATON G1651 from Kraton Performance Polymers Inc. |
| SEP | Polystyrene-poly(ethylene-propylene) diblock copolymer (CAS Reg. No. 68648-89-5) having a polystyrene content of about 37 weight percent; obtained from Kraton Polymers as KRATON G1701. |
| PP-g-MA | Maleic anhydride-grafted polypropylene, CAS Reg. No. 25722-45-6, having a melt flow rate of about 200 grams per 10 minutes, measured at 190° C. and 2.16 kilogram load according to ASTM D1238; obtained as Bondyram 1010 from Polyram. |

TABLE 1-continued

| Component | Description |
|---|---|
| LLDPE | Linear low density polyethylene, CAS Reg. No. 25087-34-7, having a melt flow rate of about 20 grams per 10 minutes at 190° C. and 2.16 kilogram load; obtained as LLDPE M200024 from SABIC. |
| AO-1 | Reaction products of phosphorus trichloride with 1,1'-biphenyl and 2,4-bis(1,1-dimethylethyl)phenol, CAS Reg. No. 119345-01-6; obtained as HOSTANOX ™ P-EPQ ™ from Clariant. |
| AO-2 | Octadecyl 3,5-di-tert-butyl-4-hydroxyhydrocinnamate, CAS Reg. No. 2082-79-3; obtained as IRGANOX 1076 from BASF. |
| GF | Chopped glass fibers, CAS Reg.No. 65997-17-3; obtained as FoodContact ™ 242 from Owens Corning. |

The compositions of the following examples were prepared by melt-blending in a Werner & Pfleiderer 30 millimeter internal diameter twin-screw extruder operated at 250 rotations per minute and a material throughput of about 16 kilograms/hour (35 pounds/hour). Glass fibers were fed into the downstream port using separate feeders, while all other solid components were added at the feed throat. The extruder temperature was maintained at 240° C. (464° F.) in zone 1 (the most upstream zone), at 260° C. (500° F.) in zones 2-10, and at 288° C. (550° F.) at the die. The torque was maintained at 65%. The compounded extrudate was cooled and pelletized by strand-cutting.

All materials were blended together and fed by the main feeder. The strand of extruded composition was cut into pellets and dried. Test articles were injection molded on a 120 Ton VanDorn injection molding machine using a barrel temperature of 304° C. (580° F.) and a mold temperature of about 88° C. (about 190° F.).

Molded samples of the compositions were characterized according to the following tests.

Flexural modulus and flexural stress, expressed in units of megapascals, were measured at 23° C. according to ISO 178. Unnotched Izod impact strength, expressed in units of kilojoules/meter$^2$, was measured according to ISO 180, at 23° C. and −30° C. Tensile stress at break, expressed in units of megapascals (MPa), and tensile strain at break, expressed in units of percent, were measured at 23" C, according to ISO 527 using a test speed of 5 millimeters per minute. Tensile modulus, expressed in units of megapascals (MPa), was measured at 23" C, according to ISO 527 using a test speed of 1 millimeter per minute. Heat deflection temperature was measured according to ISO 75 and expressed in units of degrees Celsius, a flatwise test direction, test specimens with dimensions 80 mm×10 mm×4 mm, a stress of 1.8 megapascals, a deflection of 0.25 millimeters at reading, and a heating rate of 2° C./minute. Density, expressed in grams per cubic centimeter, was measured according to ASTM D 792, at 23° C. Melt volume rate (MVR), expressed in units of cubic centimeter per 10 minutes, and as measured according to ISO 1133, at 300° C. and 10 kilogram load.

Knitline tensile stress at break, expressed in units of megapascals (MPa), and knitline tensile strain at break, expressed in units of percent, were measured at 23° C., according to ISO 527 using a test speed of 5 millimeters per minute. Knitline tensile modulus, expressed in units of megapascals (MPa), was measured at 23° C., according to ISO 527 using a test speed of 1 millimeter per minute. Tensile specimens with knit-lines were produced by impinging melt fronts from two gates located at opposite ends of the dumbbell-shaped mold for comparison to those without knit-lines were prepared by single-gated injection molding.

In addition to the above-described tests, the compositions (as pellets and tensile bars) were tested for free butadiene.

Free butadiene content was determined by gas chromatography using a headspace gas chromatograph equipped with CHROMPACK Capillary Column CP-PoraPLOT Q-HT of length 27.5 meters, internal diameter 0.32 millimeter, and film thickness 10 micrometers; an injection volume of 25 microliters. To prepare a stock solution of 1,3-butadiene, a septum for a 25 milliliter vial was perforated twice with a hollow needle, which was left in one of the perforations. The vial with septum and screwcap was weighed. Twenty milliliters of N,N-dimethylacetamide were pipetted into the vial. The vial was weighed again. The vial was closed with the screw cap, which included the hollow needle and second perforation. Working in a fume hood, approximately 0.3 grams of 1,3-butadiene was introduced to the vial via a thin tube through the second perforation. The vial with screw cap and hollow needle were reweighed. The concentration of 1,3-butadiene in the vial was calculated as milligrams of 1,3-butadiene per gram of solution. To prepare 1,3-butadiene standard solutions, four sample vials with septum and cap were weighed. Twenty milliliters of N,N-dimethylacetamide was pipetted into each vial. 1,3-Butadiene stock solution volumes of 0.1, 0.5, 1.0, and 2.0 milliliters were pipetted into the four vials, respectively. The vials were reweighed. The concentration of 1,3-butadiene in each vial was calculated in milligrams 1,3-butadiene per gram of solution. An internal standard solution was prepared by pipetting 20 milliliters of N,N-dimethylacetamide into a 25 milliliter vial, capping the vial, and adding 40 microliters of n-pentane via syringe. Analytical samples were prepared as follows. An empty 25 milliliter sample vial was purged with purified nitrogen. The headspace vial, including septum and cap, was weighed. Approximately 1.00 gram of solid sample was introduced to the vial, with the precise weight of the solid being noted. Five milliliters of N,N-dimethylacetamide was pipetted into the vial, which was then capped. Twenty microliters of internal standard solution was added to the vial via syringe through the septum. The procedure was repeated to generate a total of four sample vials. Twenty microliters of 1,3-butadiene standard solutions A, B, C, and D were introduced to the four vials, respectively. The vials were placed in a shaker and shaken overnight. A 1 microliter volume of the head space of each sample was analyzed by gas chromatography, and peak areas for the n-pentane internal standard and 1,3-butadiene were noted. For each sample, the concentration of 1,3-butadiene was calculated, as was the ratio of 1,3-butadiene and n-pentane peak areas. The ratio of peak area to added 1,3-butadiene concentration was plotted and fitted to the equation y=ax+b, where y is the peak area ratio of 1,3-butadiene to n-pentane, a is the slope of the regression in kilograms per milligram, x is the concentration of 1,3-butadiene in the solid in milligrams per kilogram, and b is the intercept of the regression line. The concentration of butadiene in the solid is calculated as b/a, where a is the slope of the regression line in kilograms per milligram, and b is the intercept of the regression line. The result is the concentration of 1,3-butadiene in the solid in units of milligrams 1,3-butadiene per kilogram of polymer (equivalent to parts per million by weight of 1,3-butadiene). A maximum of 1 ppm free butadiene was considered acceptable. The detection limit of this method was 0.2 ppm.

Tensile modulus retention ("TM retention") is the tensile modulus of a tensile bar double gated compared to the tensile modulus of a tensile bar single gated.

Compositions and properties are summarized in Table 2. For each composition, component amounts are expressed in weight percent, based on the total weight of the composition. "CE" denotes a comparative example, and "E" indicates an example according to the present disclosure.

grades. This is attributed to the lack of fiber flow across the knit-line, which makes the material in the knit-line region act as if it is not reinforced. The knit-line strength could be changed through process modifications. The occurrence of knit-lines reduces the mechanical strength of the test pieces especially of amorphous thermoplastics.

Additional fatigue testing of selected samples (CE3 vs. E1 and E2) at various R ratios and temperatures using injection molded water pressure vessels was also done, as shown in Table 3. R ratio can be expressed as either $P_{min}/P_{max}$, where P is water pressure, or $\sigma_{min}/\sigma_{max}$, where $\sigma$ is a sinusoidal stress applied to the testing vessels. The pressure vessels were injection molded on a Kraus Maffei 200 molding machine with temperature settings from hopper to barrel of 60, 270, 280, 290, 300, 295, 295, and 290° C. and a tool

TABLE 2

| | Units | CE1 | CE2 | CE3 | E1 | E2 | E3 | E4 | CE4 | CE5 |
|---|---|---|---|---|---|---|---|---|---|---|
| Component | | | | | | | | | | |
| PPE-1 | wt % | | 37.5 | 37.5 | 37.5 | 37.5 | 37.5 | 37.5 | 37.5 | 37.5 |
| PPE-2 | wt % | 37.5 | | | | | | | | |
| HIPS | wt % | | 18.5 | | | | | | | |
| PS | wt % | 30.7 | 12.2 | 30.7 | 28.2 | 25.7 | 23.2 | 18.5 | 25.7 | 25.7 |
| SEBS | wt % | | | | 2.5 | 5 | 7.5 | 12.2 | | |
| SEP | wt % | | | | | | | | 5 | |
| PP-g-MA | wt % | | | | | | | | | 5 |
| LLDPE | wt % | 1.5 | 1.5 | 1.5 | 1.5 | 1.5 | 1.5 | 1.5 | 1.5 | 1.5 |
| AO-1 | wt % | 0.15 | 0.15 | 0.15 | 0.15 | 0.15 | 0.15 | 0.15 | 0.15 | 0.15 |
| AO-2 | wt % | 0.15 | 0.15 | 0.15 | 0.15 | 0.15 | 0.15 | 0.15 | 0.15 | 0.15 |
| GF | wt % | 30 | 30 | 30 | 30 | 30 | 30 | 30 | 30 | 30 |
| Properties | | | | | | | | | | |
| Flex. Mod. | MPa | 9251.7 | 8922.7 | 9222.3 | 9070.3 | 8793.3 | 8458.3 | 7862.7 | 8927.3 | 9548.0 |
| Flex. Strength | MPa | 220.3 | 209.3 | 219.9 | 215.8 | 206.7 | 199.0 | 176.9 | 203.6 | 109 |
| HDT | ° C. | 148.73 | 145.33 | 146.57 | 147.57 | 148.93 | 149.60 | 152.40 | 148.70 | 148.73 |
| Unnotched IZOD (23° C.) | kJ/m² | 34.93 | 35.76 | 35.38 | 36.61 | 39.45 | 34.83 | 38.92 | 31.88 | 16.31 |
| Unnotched IZOD (−30° C.) | kJ/m² | 39.96 | 33.22 | 37.85 | 34.96 | 43.84 | 41.08 | 40.61 | 33.95 | 16.05 |
| Tens. Mod. (single gated) | MPa | 8872.6 | 8624 | 8996.8 | 8775.6 | 8427.2 | 8048.4 | 7530.6 | 8574.2 | 8771 |
| Tens. Stress @ brk (single gated) | MPa | 137.24 | 127.48 | 136.24 | 131.02 | 126.24 | 116.66 | 103.84 | 125.54 | 59.44 |
| Tens. Strain @ brk (single gated) | % | 2.14 | 2.24 | 2.20 | 2.28 | 2.24 | 2.28 | 2.48 | 2.20 | 1.38 |
| Knitline tens. Mod. (double gated) | MPa | 7154.6 | 6741.2 | 7218.6 | 6678 | 6347 | 5999.8 | 5189.2 | 6216.8 | 6254 |
| Knitline tens. Stress @ brk (double gated) | MPa | 65.31 | 63.02 | 65.82 | 63.65 | 57.42 | 50.79 | 38.28 | 57.77 | 29.73 |
| Knitline tens. Strain @ brk (double gated) | % | 1.00 | 1.06 | 0.98 | 1.06 | 1.04 | 0.96 | 0.84 | 1.02 | 0.56 |
| Density | g/cm³ | 1.29 | 1.29 | 1.29 | 1..28 | 1.28 | 1.27 | 1.26 | 1.28 | 1.27 |
| MVR | cm³/10 min | 26.53 | 13.82 | 17.5 | 15.42 | 12.39 | 11.66 | 8.76 | 16.70 | 41.07 |
| Free butadiene (pellets)[1] | ppm | ND | 8.9 | ND | ND | ND | ND | ND | ND | ND |
| Free butadiene (tensile bar)[1] | ppm | ND | 6.6 | ND | ND | ND | ND | ND | ND | ND |
| TM Retention | % | 81 | 78 | 80 | 76 | 75 | 75 | 69 | 73 | 71 |

[1]"ND" means not detectable (i.e., less than 0.2 ppm)

As shown in Table 2, Examples E1-E4 showed a good balance of mechanical properties, including tensile properties, flexural properties, and impact strength. Additionally, the compositions of E1-E4 exhibited non-detectable amounts of free butadiene (detection limit: 0.2 ppm). No significant decrease in the knitline tensile modulus retention was observed in the Examples of E1-E4 vs. Comparative Examples CE1-CE5 (having no SEBS) (Table 2). The presence of glass fibers significantly reduced the knit-line factor based on strength and strain to failure for the reinforced grades of all polymers relative to their respective unfilled temperature of 120° C. The injection molded pressure vessels were used to estimate the fatigue related performance of materials, had targeted dimensions of a length of 199 millimeters, a diameter of 48 millimeters, and a wall thickness of 2.8 millimeters.

Fatigue performance of pressure vessels was monitored until a failure occurred due to the fatigue built up by the applied sinus type of hoop stress (i.e., water pressure) inside a water filled top-gated injection molded pressure vessel. The pulsator equipment produces a precise sine pressure wave up to 1 Hz frequency on a closed circulating loop of water. Water can be heated and controlled up to 95° C. For this test, the maximum applied stress ($\sigma_{max}$) and water temperature were varied with a fixed R, the ratio of the minimum applied stress ($\sigma_{min}$) to the maximum applied stress at the frequency of 1 Hz. The lowest R ratio was 0.01 and the highest R ratio was just below 1.0. When R is 1, R is constant with static loading (vs. dynamic loading for data shown in Table 3). The fatigue failure rate increases with decreasing the stress (or pressure) ratio of R. Time to failure was determined by fatigue pulsator equipment and logged with data acquisition software.

The molded pressure vessel samples were tested at different the maximum stress levels and times until failure was recorded. Multiple data points were collected (e.g., a minimum of 5 data points from 5 different vessels) from the fatigue testing, and hoop stress versus time to failure was plotted. A trend line (linear regression) was calculated based on this plot, and this trend line was used to predict the time until failure for each sample using a failure criterion of 5 MPa. Predicted time-to-failure of selected samples for their fatigue performances in shown in Table 3.

TABLE 3

| Sample | Temperature (° C.) | R ratio (Pmin/Pmax) | Equation | $R^2$ | Predicted time-to-failure at 5 MPa hoop stress (in hours) |
|---|---|---|---|---|---|
| CE3 | 60 | 0.1 | y = −5.549ln(x) + 29.659 | 0.9926 | 85 |
| E1 | 60 | 0.1 | y = −4.588ln(x) + 30.972 | 0.9719 | 287 |
| E2 | 60 | 0.1 | y = −6.089ln(x) + 30.573 | 0.9433 | 67 |
| CE3 | 85 | 0.01 | y = −6.239ln(x) + 28.821 | 0.9885 | 46 |
| E1 | 85 | 0.01 | y = −2.763ln(x) + 19.833 | 0.8586 | 215 |
| E2 | 85 | 0.01 | y = −3.186ln(x) + 19.414 | 0.9706 | 92 |

As shown in Table 3, the composition of Example 1 exhibited improved fatigue performance compared to that of CE3, with significantly increased predicted time to failure.

This disclosure further encompasses the following aspects, which are non-limiting.

Aspect 1: A poly(phenylene ether) composition comprising 25 to 40 weight percent of a poly(phenylene ether); 20 to 54 weight percent of a homopolystyrene; 1 to 20 weight percent of a hydrogenated block copolymer of an alkenyl aromatic monomer and a conjugated diene; 0.1 to 2 weight percent of a linear low density polyethylene; and 8 to 42 weight percent of a reinforcing filler; wherein weight percent of each component is based on total weight of the composition.

Aspect 2: The composition of aspect 1, wherein the poly(phenylene ether) is a poly(2,6-dimethyl-1,4-phenylene ether) having an intrinsic viscosity of 0.25 to 0.70 deciliter per gram, determined by Ubbelohde viscometer at 25° C. in chloroform.

Aspect 3: The composition of aspect 1 or 2, wherein the composition excludes non-hydrogenated rubber-modified polystyrene.

Aspect 4: The composition of any one or more of aspects 1 to 3, wherein the composition excludes polyamide.

Aspect 5: The composition of any one or more of aspects 1 to 4, wherein the hydrogenated block copolymer is a polystyrene-poly(ethylene-butylene)-polystyrene triblock copolymer having a polystyrene content of 10 to 75 weight percent, based on the weight of the polystyrene-poly(ethylene-butylene)-polystyrene triblock copolymer, and a weight average molecular weight of 60,000 to 400,000 grams per mole.

Aspect 6: The composition of any one or more of aspects 1 to 5, wherein the reinforcing filler comprises glass fibers, carbon fibers, aromatic polymer fibers, mineral fillers, or a combination comprising at least one of the foregoing.

Aspect 7: The composition of aspect 1, comprising 31 to 40 weight percent of a poly(phenylene ether); 20 to 33 weight percent of a homopolystyrene; 1 to 15 weight percent of a hydrogenated block copolymer of an alkenyl aromatic monomer and a conjugated diene; 0.1 to 1.6 weight percent of a linear low density polyethylene; and 24 to 36 weight percent of a reinforcing filler; wherein weight percent of each component is based on total weight of the composition.

Aspect 8: The composition of aspect 7, wherein the poly(phenylene ether) is a poly(2,6-dimethyl-1,4-phenylene ether) having an intrinsic viscosity of 0.35 to 0.5 deciliter per gram, determined by Ubbelohde viscometer at 25° C. in chloroform; wherein the hydrogenated block copolymer is a polystyrene-poly(ethylene-butylene)-polystyrene triblock copolymer having a polystyrene content of 25 to 35 weight percent, based on the weight of the polystyrene-poly(ethylene-butylene)-polystyrene triblock copolymer; and wherein the reinforcing filler comprises glass fiber.

Aspect 9: The composition of any one or more of aspects 1 to 8, wherein the composition further comprises 0.1 to 10 weight percent of a stabilizer, lubricant, processing aid, drip retardant, UV blocker, dye, pigment, antioxidant, anti-static agent, mineral oil, metal deactivator, or a combination comprising at least one of the foregoing, preferably an antioxidant.

Aspect 10: The composition of any one or more of aspects 1 to 9, wherein the composition comprises less than 0.2 parts per million free butadiene.

Aspect 11: A method for the manufacture of the poly(phenylene ether) composition of any one or more of aspects 1 to 10, the method comprising melt-mixing the components of the composition.

Aspect 12: An article comprising the poly(phenylene ether) composition of any one or more of aspects 1 to 10.

Aspect 13: The article of aspect 12, wherein the article is a pipe, pipe liner, pipe junction, hot and cold water device component, boiler component, central heating device component, combined hot water and central heating device component, heat exchanger component, heat pump housing, water pump housing, filter housing, water meter housing, water valve, impeller, or faucet spout.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A poly(phenylene ether) composition comprising
   34 to 40 weight percent of a poly(phenylene ether);
   18.5 to 28.2 weight percent of a homopolystyrene;
   2.5 to 12.2 weight percent of a hydrogenated block copolymer of an alkenyl aromatic monomer and a conjugated diene;
   1 to 2 weight percent of a linear low density polyethylene; and
   24 to 36 weight percent of a reinforcing filler;
   wherein weight percent of each component is based on total weight of the composition;
   wherein
   the poly(phenylene ether) is a poly(2,6-dimethyl-1,4-phenylene ether) having an intrinsic viscosity of 0.35 to 0.50 deciliter per gram, determined by Ubbelohde viscometer at 25° C. in chloroform;
   the homopolystyrene has a melt flow index of 1 to 5 grams per 10 minutes, measured at 200° C. and 5 kilogram load according to ASTM D1238-10;
   the hydrogenated block copolymer is a polystyrene-poly(ethylene-butylene)-polystyrene triblock copolymer having a polystyrene content of 25 to 35 weight percent, based on the weight of the polystyrene-poly(ethylene-butylene)-polystyrene triblock copolymer, and a weight average molecular weight of 240,000 to 301,000 grams per mole; and
   wherein the reinforcing filler comprises glass fiber, wherein the composition exhibits:
   a flexural modulus of 7862.7 to 9070.3 MPa, as determined according to ISO 178 at 23° C.;
   a tensile modulus of 7530.6 to 8775.6 MPa, as determined according to ISO 525 at 23° C.;
   a knitline tensile modulus of 5189.2 to 6678 MPa, as determined according to ISO 527 at 23° C.;
   an unnotched IZOD impact strength of 34.83 to 38.92 kJ/m$^2$, as determined according to ISO 180 at 23° C.; and
   an unnotched IZOD impact strength of 34.96 to 43.84 kJ/m$^2$, as determined according to ISO 180 at −30° C.

2. The composition of claim 1, wherein the composition excludes non-hydrogenated rubber-modified polystyrene.

3. The composition of claim 1, wherein the composition excludes polyamide.

4. The composition of claim 1, wherein the composition further comprises 0.1 to 10 weight percent of a stabilizer, lubricant, processing aid, drip retardant, UV blocker, dye, pigment, antioxidant, anti-static agent, mineral oil, metal deactivator, or a combination comprising at least one of the foregoing.

5. The composition of claim 1, wherein the composition comprises less than 0.2 parts per million free butadiene.

6. A method for the manufacture of the poly(phenylene ether) composition of claim 1, the method comprising melt-mixing the components of the composition.

7. An article comprising the poly(phenylene ether) composition of claim 1.

8. The article of claim 7, wherein the article is a pipe, pipe liner, pipe junction, hot and cold water device component, boiler component, central heating device component, combined hot water and central heating device component, heat exchanger component, heat pump housing, water pump housing, filter housing, water meter housing, water valve, impeller, or faucet spout.

* * * * *